United States Patent [19]

Belanger

[11] Patent Number: 4,909,639

[45] Date of Patent: Mar. 20, 1990

[54] BEARING ASSEMBLY FOR A SHAFT

[75] Inventor: James A. Belanger, Northville, Mich.

[73] Assignee: Belanger, Inc., Northville, Mich.

[21] Appl. No.: 209,674

[22] Filed: Jun. 21, 1988

[51] Int. Cl.$^4$ ............................................. F16C 33/08
[52] U.S. Cl. ................................... 384/296; 384/295;
384/439; 384/441; 384/906
[58] Field of Search ............... 384/295, 296, 299, 906, 384/439, 441

[56] References Cited

U.S. PATENT DOCUMENTS

| | | | |
|---|---|---|---|
| 536,048 | 3/1895 | Schofield | 384/296 |
| 4,076,347 | 2/1978 | Meek | 384/299 |
| 4,340,262 | 7/1982 | Rugh et al. | 384/906 |
| 4,615,538 | 10/1986 | Sollender | 384/295 |

Primary Examiner—Lenard A. Footland
Attorney, Agent, or Firm—Dykema Gossett

[57] ABSTRACT

A bearing assembly for a shaft comprises a body having a cylindrical bore open at one end, a mount bracket extending from the one end and an annular stop flange at the other end of the bore. An apertured bearing of a hardened plastic material is enclosed within the body and at one end has an annular stop shoulder bearing against the stop flange and defining a cylindrical extension of reduced diameter extending outwardly of the body adapted to journal a shaft. In a modification, an annular groove in the cylindrical extension outwardly of the stop flange receives a snap ring to restrain the bearing against endwise movements relative to the body.

15 Claims, 2 Drawing Sheets

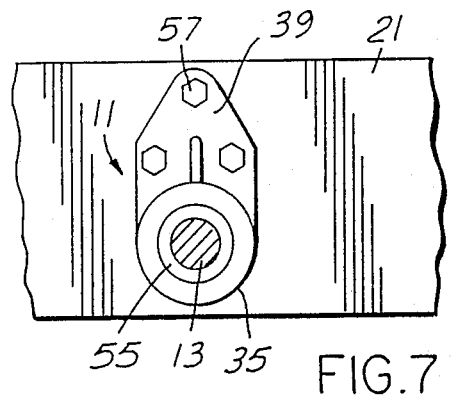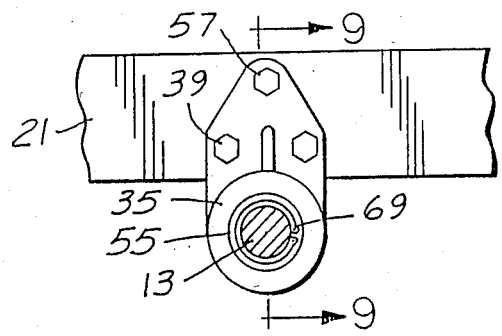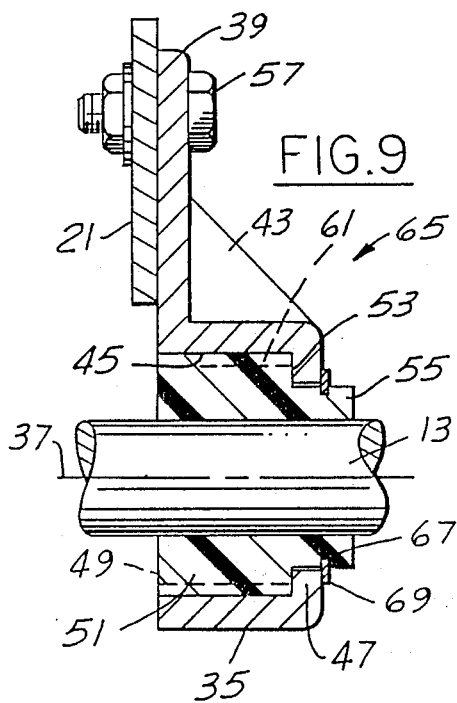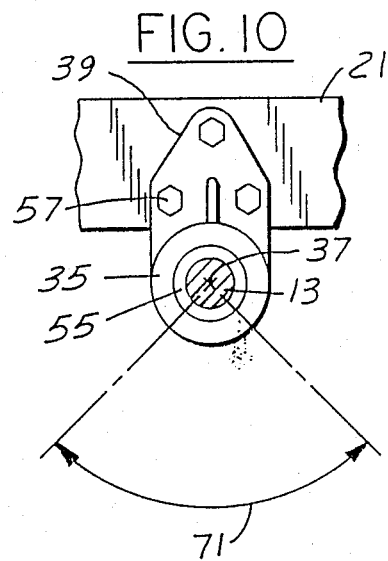

BEARING ASSEMBLY FOR A SHAFT

FIELD OF INVENTION

The present invention relates to bearings and more particularly to a bearing assembly mountable upon a support.

BACKGROUND OF THE INVENTION

Previously, there has continued to be interest in efficiently mounting and supporting bearings and bearing assemblies for journaling a shaft with respect to a support. The difficulty has often existed of providing efficient mount and support mechanisms for the bearing so that it can be mounted at a predetermined location and upon an available support. Previously, bearings for shafts become worn and must be replaced from time to time, thereby requiring an assembly which provides convenient access to the bearing for servicing or replacement.

SUMMARY OF THE INVENTION

An important feature of the present invention is to provide a bearing assembly for a shaft which includes a cast body having a cylindrical bore open at one end and including an apertured mount bracket extending from the body at its open end together with an annular stop flange at the other end of the body. An apertured cylindrical bearing of a hardened plastic material is enclosed within the body and at one end has an annular stop shoulder bearing against the stop flange and defining a cylindrical extension of reduced diameter which extends outwardly of the body, wtih the bearing and extension thereof adapted to journal a shaft.

Another important feature is to provide a body or enclosing housing for the bearing together with a convenient mechanism for mounting the body upon a suitable support at a predetermined location.

Another feature is to provide an interlocking means between the bore of the body and the bearing which restrains the bearing against rotation relative to the body.

As another feature, the interlocking means are in the form of a pair of opposed ribs extending along the bore of the body together with a pair of cooperating outwardly opening channels upon opposite portions of the bearing which receive the ribs, thus restraining the bearing against rotation within the body.

As another feature, the bearing assembly includes a means for preventing longitudinal movement of the bearing relative to the body.

It is still another important feature to provide a bearing of a hardened plastic material, as for example a hardened nylon or nylon which has been internally lubricated and is thus self-lubricating for longer life of the bearing.

These and other features and objects will be seen from the following specification and claims in conjunction with the appended drawings.

THE DRAWINGS

FIG. 7 is a fragmentary side elevational view of the present bearing assembly for a shaft supported in an upright position upon a mount plate which is fragmentarily shown.

FIG. 8 is a front elevational view of a modified bearing assembly for a shaft as suspended from a mount plate, fragmentarily shown.

FIG. 9 is a sectional view taken in the direction of arrows 9-9 of FIG. 8, and upon an increased scale.

FIG. 10 is a side elevational view similar to FIG. 8 with the arrows indicating reciprocal rotation of the shaft journaled and supported upon the present bearing assembly.

It will be understood that the above drawings illustrate merely a preferred embodiments of the invention, and that other embodiments are contemplated within the scope of the claims hereafter set forth.

DETAILED DESCRIPTION OF AN EMBODIMENT OF THE INVENTION

Figure 1:
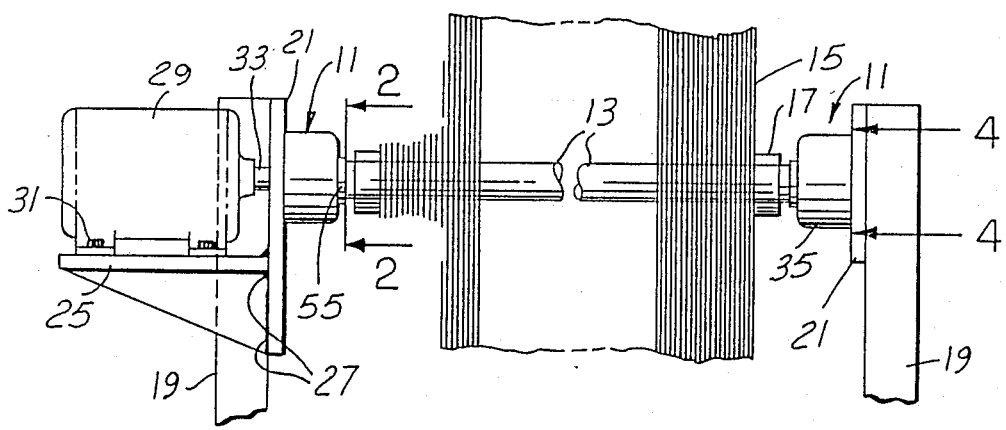
FIG. 1 is a fragmentary side elevational view of a pair of bearing assemblies supportably mounting and journaling a shaft.
Figure 2:
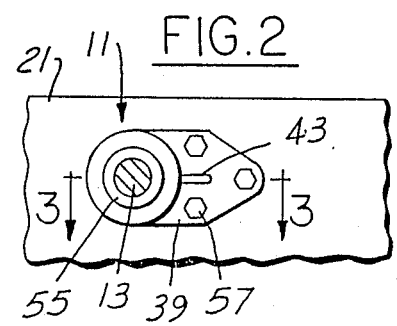
FIG. 2 is a fragmentary section of one of the bearing assemblies taken in the direction of arrows 2—2 of FIG. 1.

Referring to the drawings, FIGS. 1-7, the present bearing assembly for a shaft, generally indicated at 11, FIG. 1, of which a pair of opposed bearing assemblies are shown, supports and journals the shaft 13 and provides the support for a rotary cloth roll or wheel 15 fragmentarily shown or any other element wherein the shaft 13 may omit such wheel. A pair of hubs 17, as an example, are secured upon shaft 13 and are adapted to engage opposite ends of the cloth wheel 15 retained upon the shaft though not limited thereto.

Figure 3:
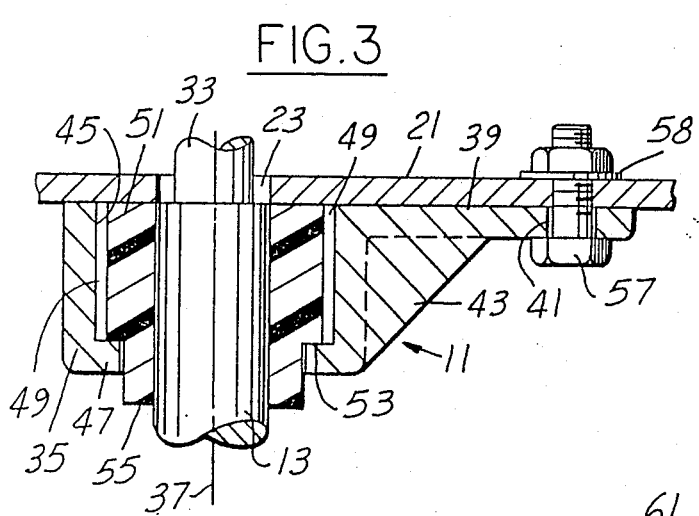
FIG. 3 is a fragmentary section of the bearing assembly taken in the direction of arrows 3—3 of FIG. 2, and upon an increased scale.
Figure 4:
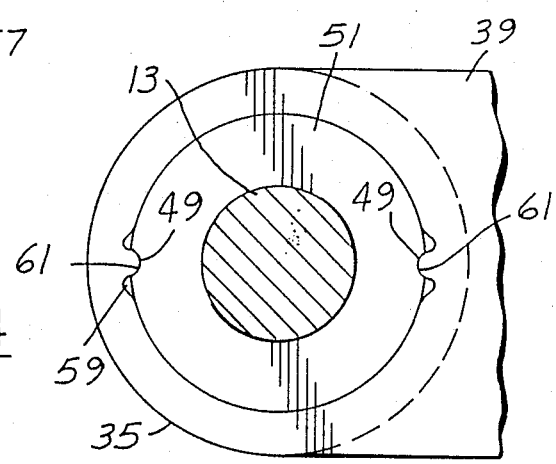
FIG. 4 is a sectional view of a bearing assembly taken in the direction of arrows 4-4 of FIG. 1, upon an increased scale, illustrating the interlock between the bearing and the body and with the supporting bracket fragmentarily shown.

In the illustrative embodiment, there are fragmentarily shown a pair of upright laterally spaced frames 19 supporting transverse mount plates 21 with one plate, FIG. 3, apertured at 23. One of the mount plates 21 supports on one side thereof the right angularly related motor mount plate 25 supported electric motor 29 anchored thereto as by fasteners 31 and including a drive shaft 33 which terminates or is coupled with shaft 13, FIG. 3.

BEARING ASSEMBLY

The present bearing assembly 11 in the illustrative embodiment is in the nature of a cylindrical casting or body 35 and may be constructed of die cast, iron, aluminum or steel, providing a unit body having a longitudinal bore 45 and extending upon longitudinal axis 37, FIG. 3. One end of the body 35 is open adjacent mount plate 21. Apertured mount bracket 39 extends from body 35 at its open end and at right angles to axis 37 and is adapted for cooperative registry with mount plate 1 and has a plurality of apertures 41 therethrough.

Inclined reinforcement rib 43 forms a part of the body 35 and extends between one side of the body 35 and mount bracket 39 and is secured to the mount plate 21 by a plurality of fasteners 57 provided with conventional lock washers 58. Formed upon the other end of the body 35 is an annular seating flange 47 which is directed radially inward, FIG. 3.

Arranged upon the side portions of body 35 upon the interior of its bore 45 and along the length thereof are a pair of opposed ribs 49 of a convex form.

Cylindrical bearing 51 of a hardened plastic material which has been internally lubricated in the molding operation thereof is nested within bore 45 of body 35 and includes an annular stop shoulder 53 which bears against the seating flange 47. Stop shoulder 53 defines a cylindrical extension 55 of the bearing of reduced diameter which projects through the seating flange 47 and extends outwardly of the body 35, cooperatively receiving shaft 13, fragmentarily shown.

In the illustration of the mounting of the bearing assembly 11, upon mount plate 21, the mount plate 21 serves as a back-up for the bearing 51, and the seating flange 47 cooperates to restrain the bearing 51 against relative endwise movement relative to the body 35. In the present illustrative embodiment, the bearing 51 is constructed of a material known in the trade as ERTALON LFX, manufactured by Erta Incorporated of Malvern, Pennsylvania. The bearing 51 is of a nylon material which has been cast, internally lubricated and therefore is self-lubricating during the life of the bearing assembly 11.

The present hardened nylon bearing 51, 55 has a longer life than conventional nylon modified with solid lubricants such as graphite and thus provides an efficient bearing assembly and will take considerable wear before replacement is required.

Figure 5:
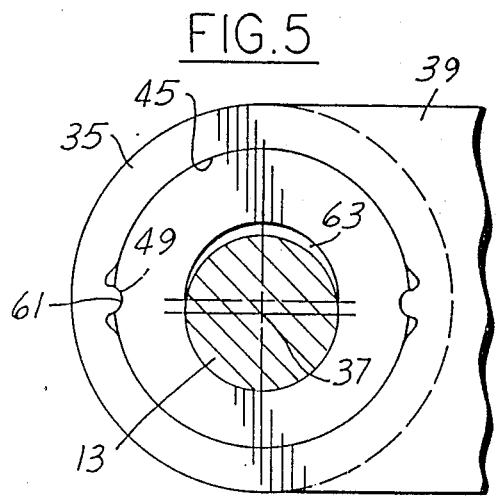
FIG. 5 is a similar view to FIG. 4 illustrating wear upon the bearing after continued use thereof.
Figure 6:
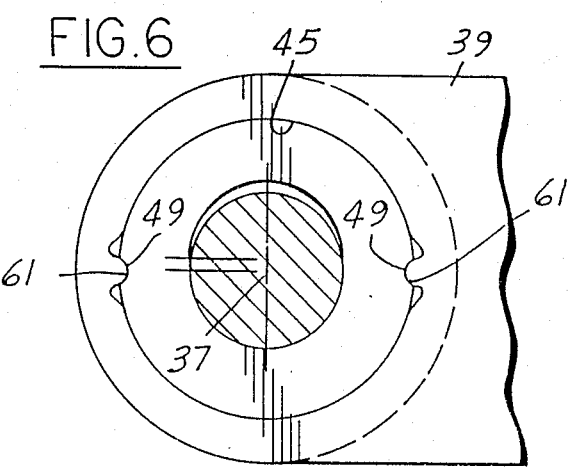
FIG. 6 is a similar view to FIGS. 4 and 5 illustrating the positioning of the bearing with respect to a body when the bearing has been removed from the body, rotated 180 degrees and reinserted.

The life of the present bearing 51, 55 is increased by its characteristic of reversibility within the body 35. For this purpose, after there has been some wear of the bearing such as shown at 63 in FIG. 5, the fasteners 57 are temporarily removed, the bearing 51 is separated from the bdoy 35 and rotated 180 degrees from the position shown in FIG. 5, and reassembled relative to the ribs 49 and corresponding elongated and parallel channels 61 provided in bearing 51 as shown in FIG. 6.

With the bearing 51 partly worn as at 63, the center line or axis of shaft 13 is shown below the center of the rib 49 in FIG. 5. When the bearing 51 has been removed from the body 35, rotated 180 degrees and reassembled, corresponding center 37 or axis of the bearing 51 is again in registry with the center line of the corresponding ribs 49, thus greatly increasing the life of the bearing.

In FIG. 7, the present bearing assembly 11 is the same as shown in FIG. 1 except that the bracket 39 is upright, suspending the bearing assembly 11 upon the mount plate 21, thus illustrating the versatility of the mounting of the present bearing assembly utilizing the apertured mount bracket 39.

In FIGS. 3 and 7, the end portion of the bearing 51 adjacent the open end of body 35 bears against mount plate 21 which serves as a stop retaining the bearing 51 within the body 35.

In the modified bearing assembly 65, FIGS. 8, 9 and 10, the bearing assembly is similar to the construction above described except that mount plate 21 is no longer backing up the open end of the body 35. Thus, there is a requirement to retain the bearing assembly 51, 55 within the body 35. For this purpose, there is provided upon the extension 55 of the bearing 51 an annular groove 67 located outwardly of the seating flange 47 within which is nested and retained the snap ring 69, FIGS. 8 and 9.

Thus, the seating flange 47 registers with the snap ring 69 and the stop shoulder 53 upon the bearing and cooperates to restrain the bearing against longitudinal movement relative to the body 35 and to retain the bearing 51 at all times within its bore 45.

Modified bearing assembly 65 further includes within the bore 45 the pair of opposed transversely arcuate ribs 49 adapted for positioning within corresponding grooves 61 upon opposite side portions of bearing 51. It is contemplated that after continued use and some wear of the bearing 51 that, upon removal of the snap ring 69, the bearing 51 may be withdrawn from the body 35, rotated 180 degrees and reinserted to thus compensate for and to provide longer use of the bearing to compensate for the previous wear.

FIG. 10 illustrates that the present bearing assembly 65 may be used in conjunction with a shaft 13 which may rock or rotate reciprocally upon the axis 37 through an arc 71 of 90 degrees as an example, or may rotate thereon.

Having described my invention, reference should now be had to the following claims.

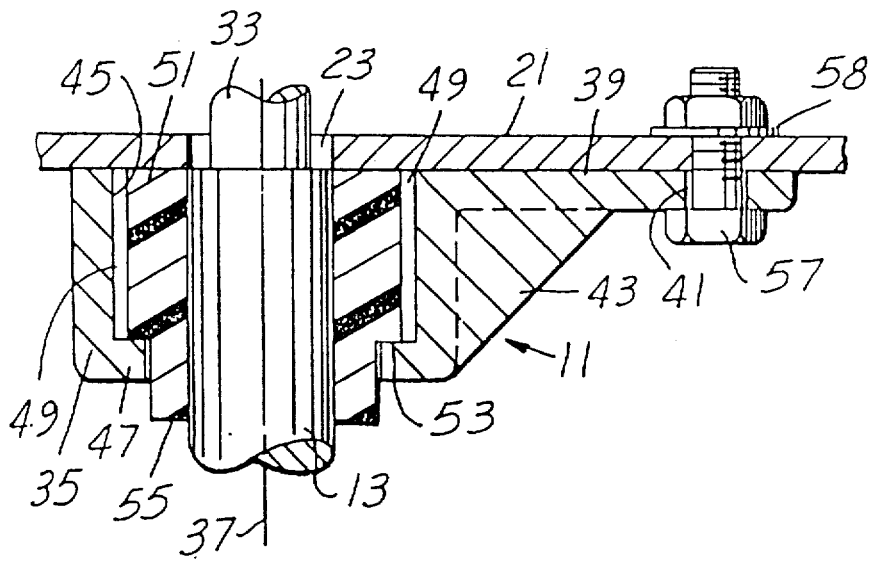

I claim:

1. A bearing assembly for a shaft comprising:
   a body having a first cylindrical bore arranged upon a longitudinal axis and extending from a first longitudinal end;
   an apertured mount bracket extending radially outwardly from said first longitudinal end of said body at a right angle to said axis;
   an annular stop flange on said body at its other longitudinal end and having a second cylindrical bore;
   an apertured cylindrical bearing of a hardened plastic material enclosed within said body and having a main portion of a main diameter and at one end having an annular stop shoulder bearing against said stop flange and defining a cylindrical extension of reduced diameter received in said second cylindrical bore and extending therethrough and outwardly of said body;
   said first cylindrical bore being of at least a first diameter, said annular stop flange extending radially inwardly from said body such that said second cylindrical bore is of a second diameter that is smaller than said first diameter, said main diameter of said main portion of said bearing being less than said first diameter;
   said main portion and said extension being adapted to journal a rotating shaft of said axis.

2. In the bearing assembly of claim 1, said body and mount bracket being a unit casting.

3. In the bearing assembly of claim 1, said bearing being constructed of an internally lubricated cast nylon material.

4. In the bearing assembly of claim 1, an apertured mount plate receiving said shaft;
   the open end of said body and said mount bracket bearing against and secured to said mount plate;
   said mount plate and stop flange restraining said bearing against endwise movement along said axis.

5. In the bearing assembly of claim 1, interlocking means upon the interior of said said first cylindrical bore and upon said bearing restraining said bearing against rotation relative to said body.

6. In the bearing assembly of claim 5, said interlocking means including a longitudinal groove on one of said body and bearing and a longitudinal rib upon the other thereof.

7. In the bearing assembly of claim 5, said interlocking means including a pair of opposed ribs extending upon and along said said first cylindrical bore and a pair of cooperating outwardly opening channels upon opposite portions of said bearing.

8. In the bearing assembly of claim 7, said bearing after predetermined wear thereon by said shaft, being removable from said body and rotated 180 degrees and reassembled relative to said ribs to compensate for said wear.

9. In the bearing assembly of claim 5, there being an annular channel in said cylindrical extension, outwardly of said stop flange; and
    a snap ring nested within said channel and bearing against said stop flange, said stop flange and snap ring restraining said bearing against endwise movements along said axis relative to said body.

10. In the bearing assembly of claim 1, the relative diameters of said first cylindrical bore and said bearing allowing said bearing to be removed from said first longitudinal extent of said body.

11. In the bearing assembly of claim 1, said body and bracket being cast from a material selected from the group consisting of die cast aluminum and steel.

12. In the bearing assembly of claim 1, said body being cylindrical.

13. In the bearing assembly of claim 1, there being an annular channel in said cylindrical extension, outwardly of said stop flange; and
    a snap ring nested within said channel and bearing against said stop flange, said stop flange and snap ring restraining said bearing against endwise movements along said axis relative to said body.

14. In the bearing assembly of claim 1, said main diameter of said main portion of said bearing is greater than said second diameter.

15. A bearing assembly for a shaft comprising:
a body having a first bore arranged upon a longitudinal axis and extending from a first longitudinal end;
an apertured mount bracket extending radially outwardly from said first longitudinal end of said body at a right angle to said axis;
an annular stop flange on said body at its other longitudinal end and having a second bore;
an apertured bearing of a hardened plastic material enclosed within said body and having a main portion of a main diameter and at one end having an annular stop shoulder bearing against said stop flange and defining a extension of reduced diameter received in said second bore and extending therethrough and outwardly of said body;
said first bore being of at least a first diameter, said annular stop flange extending radially inwardly from said body such that said second bore is of a second diameter that is smaller than said first diameter, said main diameter of said main portion of said bearing being less than said first diameter;
said main portion and said extension being adapted to journal a rotating shaft of said axis.

* * * * *

UNITED STATES PATENT AND TRADEMARK OFFICE
CERTIFICATE OF CORRECTION

PATENT NO. : 4,909,639

DATED : March 20, 1990

INVENTOR(S) : James A. Belanger

It is certified that error appears in the above-identified patent and that said Letters Patent is hereby corrected as shown below:

```
The title page showing the illustrative figure should be deleted to appear
as per attached title page.
```

Signed and Sealed this

Second Day of April, 1991

*Attest:*

HARRY F. MANBECK, JR.

*Attesting Officer*    *Commissioner of Patents and Trademarks*

United States Patent [19]

Belanger

[11] Patent Number: 4,909,639
[45] Date of Patent: Mar. 20, 1990

[54] BEARING ASSEMBLY FOR A SHAFT
[75] Inventor: James A. Belanger, Northville, Mich.
[73] Assignee: Belanger, Inc., Northville, Mich.
[21] Appl. No.: 209,674
[22] Filed: Jun. 21, 1988
[51] Int. Cl.⁴ .............................................. F16C 33/08
[52] U.S. Cl. ..................................... 384/296; 384/295; 384/439; 384/441; 384/906
[58] Field of Search .............. 384/295, 296, 299, 906, 384/439, 441

[56] References Cited
U.S. PATENT DOCUMENTS

| | | | |
|---|---|---|---|
| 536,048 | 3/1895 | Schofield | 384/296 |
| 4,076,347 | 2/1978 | Meek | 384/299 |
| 4,340,262 | 7/1982 | Rugh et al. | 384/906 |
| 4,615,538 | 10/1986 | Sollender | 384/295 |

Primary Examiner—Lenard A. Footland
Attorney, Agent, or Firm—Dykema Gossett

[57] ABSTRACT

A bearing assembly for a shaft comprises a body having a cylindrical bore open at one end, a mount bracket extending from the one end and an annular stop flange at the other end of the bore. An apertured bearing of a hardened plastic material is enclosed within the body and at one end has an annular stop shoulder bearing against the stop flange and defining a cylindrical extension of reduced diameter extending outwardly of the body adapted to journal a shaft. In a modification, an annular groove in the cylindrical extension outwardly of the stop flange receives a snap ring to restrain the bearing against endwise movements relative to the body.

15 Claims, 2 Drawing Sheets